US012098812B1

(12) United States Patent
Li

(10) Patent No.: US 12,098,812 B1
(45) Date of Patent: Sep. 24, 2024

(54) PROJECTOR

(71) Applicant: Jieqiong He, Foshan (CN)

(72) Inventor: Jialin Li, Zhuhai (CN)

(73) Assignee: Jieqiong He, Foshan (CN)

( * ) Notice: Subject to any disclaimer, the term of this patent is extended or adjusted under 35 U.S.C. 154(b) by 0 days.

(21) Appl. No.: 18/651,674

(22) Filed: Apr. 30, 2024

(30) Foreign Application Priority Data

Mar. 30, 2024 (CN) ......................... 202420650276.3

(51) Int. Cl.
*F21S 10/00* (2006.01)
*F21V 3/04* (2018.01)
*F21V 14/06* (2006.01)
*F21W 121/00* (2006.01)

(52) U.S. Cl.
CPC ............ *F21S 10/007* (2013.01); *F21V 3/049* (2013.01); *F21V 14/06* (2013.01); *F21W 2121/008* (2013.01)

(58) Field of Classification Search
CPC ...... F21S 10/046; F21S 10/026; F21S 10/007; F21S 10/063; F21W 2121/008; F21V 14/06; G03B 21/00; G03B 21/208
See application file for complete search history.

(56) References Cited

U.S. PATENT DOCUMENTS 3,538,323 A * 11/1970 Ziegler ..................... F21V 9/40
40/431
10,072,824 B1 * 9/2018 Xiong ....................... F21V 5/00
11,041,596 B1 * 6/2021 Zhang ...................... F21V 3/049
11,118,753 B1 * 9/2021 Zheng ................. F21V 33/0056
11,281,083 B1 * 3/2022 Xin ....................... G03B 21/145
11,428,383 B1 * 8/2022 Zheng ........................ F21V 5/02
11,585,492 B1 * 2/2023 Pang .......................... F21V 9/00
11,662,071 B1 * 5/2023 Wang ......................... F21V 5/04
362/268
11,739,911 B1 * 8/2023 Liu ......................... F21V 29/70
362/269
11,762,265 B1 * 9/2023 Pang ...................... G03B 21/14
353/100
11,906,136 B1 * 2/2024 Pang ....................... F21V 5/008
11,920,763 B1 * 3/2024 Li ...................... G03B 21/2046
(Continued)

FOREIGN PATENT DOCUMENTS

CN 201859539 U 6/2011
CN 104062830 A 9/2014
(Continued)

*Primary Examiner* — Alexander K Garlen
(74) *Attorney, Agent, or Firm* — George D. Morgan

(57) ABSTRACT

The present invention discloses a projector, including: a fastening base; an electric motor assembly, and a light source assembly, component are fastened to the fastening base; a first optical element, driven by the electric motor assembly, the first optical element is selected from at least one of the following types of optical elements: slides, condensing lenses or corrugated pieces; and light emitted by the light source assembly passes through the first optical element; and a second optical element, located above the first optical element, wherein the first optical element is located in a range of 1F-2F of the second optical element; and the second optical element is selected from at least one of the following types of optical elements: multi-section lenses, convex lenses or irregular elongated lenses.

20 Claims, 10 Drawing Sheets

(56) References Cited

U.S. PATENT DOCUMENTS

| | | | | |
|---|---|---|---|---|
| 2008/0165527 | A1* | 7/2008 | VanderSchuit | F21S 10/06 362/147 |
| 2015/0211701 | A1* | 7/2015 | Chien | F21V 7/00 362/235 |
| 2017/0219176 | A1* | 8/2017 | Chang | A63J 5/025 |
| 2021/0164628 | A1* | 6/2021 | Zheng | F21S 10/063 |
| 2021/0364142 | A1* | 11/2021 | Zheng | F21V 3/049 |
| 2021/0372596 | A1* | 12/2021 | Wang | F21V 3/061 |

FOREIGN PATENT DOCUMENTS

| | | | |
|---|---|---|---|
| CN | 109100904 | A | 12/2018 |
| CN | 112882327 | A | 6/2021 |

* cited by examiner

PROJECTOR

CROSS-REFERENCE TO RELATED APPLICATIONS

The application claims priority to Chinese patent application No. 2024206502763, filed on Mar. 30, 2024, the entire contents of which are incorporated herein by reference.

TECHNICAL FIELD

The present invention relates to the technical field of projectors, in particular to a projector for forming aurora borealis.

BACKGROUND

An existing projector includes a shell, a light source assembly mounted in the shell, a condensing lens and a light transmitting piece located above the light source assembly, an electric motor assembly for driving the light transmitting piece to rotate, and a projection lens located above the light transmitting piece. The shell includes an accommodating groove, and a first shell and a second shell which form the accommodating groove, and the second shell includes a projection opening arranged in vertical communication with the accommodating groove. The condensing lens is arranged above the light source assembly in a covering manner, and the projection lens is mounted at the projection opening. The projection lens includes a plurality of sections, and the plurality of sections are greatly different from the light transmitting piece.

In the above structure, the distances between the plurality of sections and the light transmitting piece are greatly different, such that the distances between the light transmitting piece and the plurality of sections cannot be guaranteed, resulting in the unclear projection effect, which cannot meet the use requirements.

SUMMARY

In order to solve the problems in the background, the present invention provides a projector with a first optical element located in a range of 1F-2F of a second optical element.

In order to achieve the above purpose, the following technical means are adopted in the present invention:

- a projector comprises: a fastening base; an electric motor assembly, fastened to the fastening base; a light source assembly, firmly connected to the fastening base; a first optical element, located above the electric motor assembly, where the electric motor assembly drives the first optical element; the first optical element is selected from at least one of the following types of optical elements: slide, condensing lens or corrugated piece; and light emitted by the light source assembly passes through the first optical element; and a second optical element, located above the first optical element, where the first optical element is located in a range of 1F-2F of the second optical element; and the second optical element is selected from at least one of the following types of optical elements: multi-section lenses, imaging lens or multiple irregular elongated lenses.

Further, parabolic contours of two adjacent elongated lenses at the same position are at least partially identical.

Further, each of the elongated lenses has a width range of 2-20 mm, and as the radian of the elongated lens increases, a corresponding focal length is longer.

Further, each of the elongated lenses comprises a first portion deformed leftwards and a second portion deformed rightwards, or the first portion deformed leftwards, the second portion deformed rightwards and a third portion deformed leftwards.

Further, the first optical element is located in a range of 1F-2F of the elongated lenses.

Further, the distances between the highest points of the plurality of elongated lenses in the middle of the second optical element and the same horizontal plane of the first optical element are equal.

Further, the second optical element comprises a first optical plate and second optical plates arranged around the first optical plate, the first optical plate is located above the first optical element, and the second optical plates are arranged around the light source assembly; and the fastening base comprises a step portion recessed downwards from a top surface thereof, and the step portion prevents the second optical element from moving downwards.

Further, the first optical element comprises multiple convex lenses formed by upward protrusion, wherein the height of the convex lens is smaller than that of the second optical element, at least some convex lenses include a refractive surface and/or a reflective surface, and the multiple convex lenses at least include a first convex lens, a second convex lens, and/or a third convex lens, the height of the first convex lens in the up and down directions is lower than the height of the second convex lens in the up and down directions, and/or the height of the second convex lens in the up and down directions is lower than the height of the third convex lens in the up and down directions.

Further, wherein the second optical element comprises a first optical plate and second optical plates around the first optical plate, the plurality of elongated lenses of the first optical plate are formed by extending in a front-and-back direction, the plurality of elongated lenses of a plurality of the second optical plates are formed by extending in an up-and-down direction, the plurality of elongated lenses are arranged on an outer surface or an inner surface of the first optical plate, inner surfaces or outer surfaces of at least some of the second optical plates are provided with the elongated lenses, and the first optical plate and the plurality of second optical plates are integrally formed or separately formed.

A projector comprises: a fastening base; an electric motor assembly, fastened to the fastening base; a light source assembly, firmly connected to the fastening base; a first optical element, located above the electric motor assembly, where the electric motor assembly drives the first optical element; and the first optical element comprises a plurality of convex lenses, and one of the convex lenses has a different focal length, radian or orientation from the other convex lens; and a second optical element, located above the first optical element, where the second optical element comprises a plurality of irregular elongated lenses, outer contours of cross sections of one of the elongated lenses and the other elongated lens at the same position are at least partially identical, and the first optical element is located in a range of 1F-2F of the elongated lenses.

Further, the second optical element comprises a first optical plate and second optical plates arranged around the first optical plate, the first optical plate is located above the first optical element, the second optical plates are arranged around the light source assembly, and the second optical plates are fastened to the fastening base.

Further, the F values of the plurality of elongated lenses are in a range of 10-60 mm, and the width of each of the elongated lenses in a length direction is gradually increased and then gradually reduced, or is gradually reduced and then gradually increased.

Further, the fastening base comprises a bottom base and an upper base formed by extending upwards from the bottom base, the upper base comprises an accommodating cavity penetrating upwards and a limiting groove arranged in communication with the accommodating cavity, the limiting groove is formed by being recessed downwards from a top surface of the upper base, the electric motor assembly is accommodated in the accommodating cavity and is fastened to the upper base, the light source assembly is mounted in the limiting groove and is located above the electric motor assembly, and the second optical element is arranged around the light source assembly and is firmly connected to the bottom base.

Further, the second optical element comprises a first optical plate and a plurality of second optical plates around the first optical plate, each of the first optical plate and the second optical plates is provided with the plurality of elongated lenses, the first optical plate is located above the first optical element, the plurality of elongated lenses are arranged on an outer surface or an inner surface of the first optical plate, inner surfaces or outer surfaces of at least some of the second optical plates are provided with the elongated lenses, and the first optical plate and the plurality of second optical plates are integrally formed or separately formed.

A projector comprises: a fastening base; an electric motor assembly, fastened to the fastening base; a light source assembly, firmly connected to the fastening base; a first optical element, located above the electric motor assembly, where the electric motor assembly drives the first optical element; and the first optical element comprises a plurality of convex lenses, and one of the convex lenses has a different focal length, length or orientation from the other convex lens; and a second optical element, located above the first optical element, where the second optical element comprises a plurality of irregular elongated lenses, the first optical element is located in a range of 1F-2F of the elongated lenses, a slot is formed between two adjacent elongated lenses, and a value of an included angle formed by extension lines of the slot is in a range of 98-178 degrees.

Further, each of the elongated lenses has a width range of 2-20 mm, and outer contours of cross sections of two adjacent elongated lenses at the same position are at least partially identical.

Further, the second optical element comprises a first optical plate and a plurality of second optical plates around the first optical plate, the plurality of second optical plates are firmly connected to the fastening base, each of the first optical plate and/or the second optical plates is provided with the plurality of irregular elongated lenses, the plurality of elongated lenses are arranged on an outer surface or an inner surface of the first optical plate, inner surfaces or outer surfaces of at least some of the second optical plates are provided with the elongated lenses, and the first optical plate and the plurality of second optical plates are integrally formed or separately formed.

Further, the second optical element comprises a first optical plate and second optical plates arranged around the first optical plate, the first optical plate is located above the first optical element, and the second optical plates are arranged around the light source assembly.

Further, the plurality of second optical plates are arranged around the first optical plate, the first optical plate comprises the plurality of elongated lenses, the fastening base comprises snap-fitting blocks, each of the snap-fitting blocks comprises a guide slope, at least two of the second optical plates are provided with lock blocks, and the lock blocks move downwards along the guide slopes to be snap-fitted with the snap-fitting blocks; or the second optical element is fastened to the fastening base by means of screws, and the screws are located at a joint of two of the second optical plates.

Further, the plurality of elongated lenses are arranged in a left-and-right direction, the length of each of the elongated lenses is greater than three times the width thereof, and the F values of the elongated lenses are in a range of 10-60 mm.

Compared with the prior art, the projector in the present invention has the following beneficial effects:

the electric motor assembly is fastened to the fastening base, the light source assembly is firmly connected to the fastening base, the first optical element is located above the electric motor assembly, the electric motor assembly drives the first optical element, the first optical element is selected from at least one of the following types of optical elements: slides, condensing lenses or corrugated pieces; and light emitted by the light source assembly passes through the first optical element; and a second optical element, located above the first optical element, wherein the first optical element is located in a range of 1F-2F of the second optical element; and the second optical element is selected from at least one of the following types of optical elements: multi-section lenses, imaging lenses or irregular elongated lenses. The first optical element is located in a range of 1F-2F of the second optical element, thus it is ensured that the first optical element is located in a clear projection range of the second optical element, the amplified projection effect can be achieved, and the use requirements can be met.

DESCRIPTION OF REFERENCE NUMERALS IN SPECIFIC EMBODIMENTS

Figure 1:
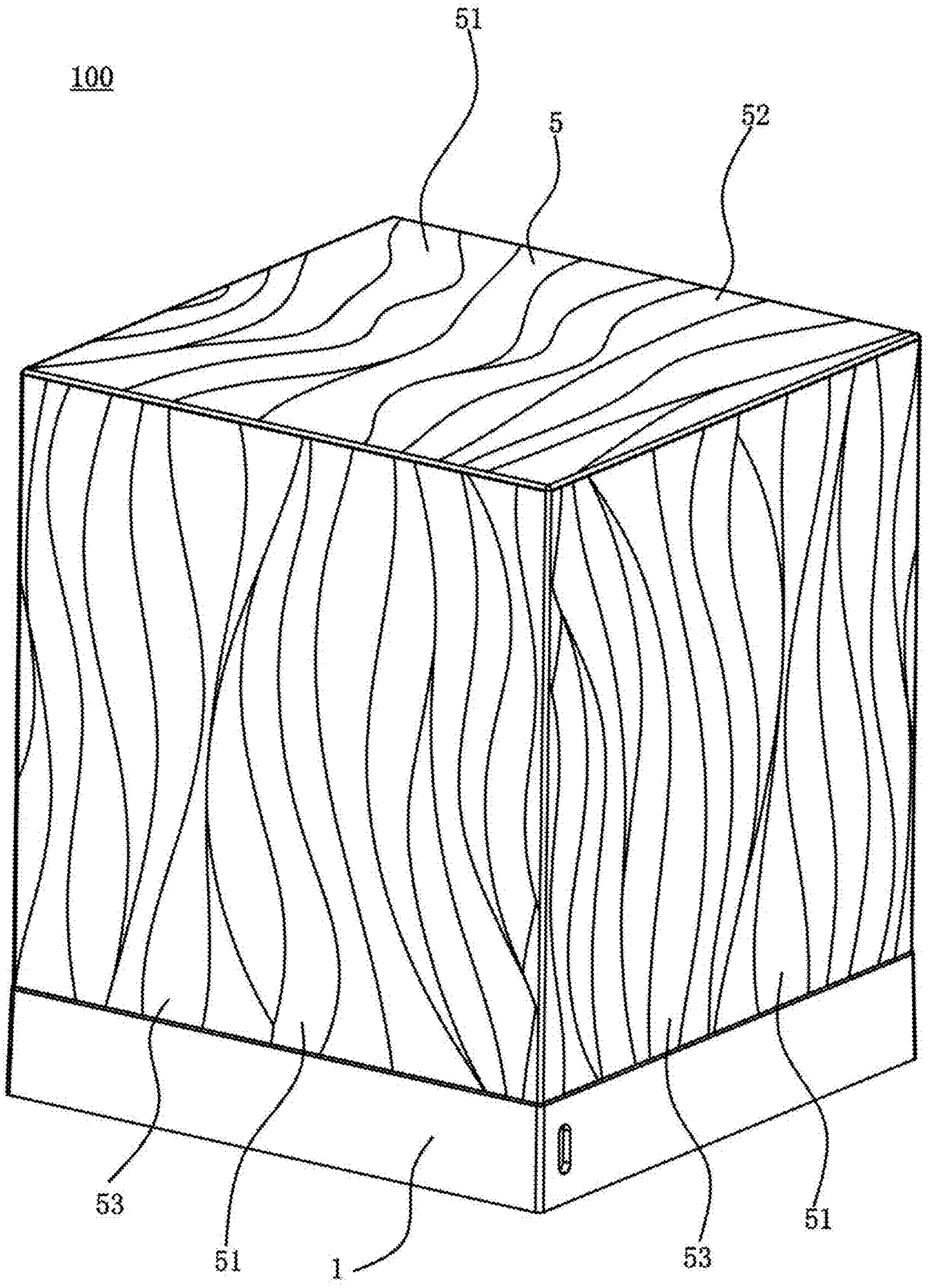
FIG. 1 is a three-dimensional view of a projector in the present invention.
Figure 2:
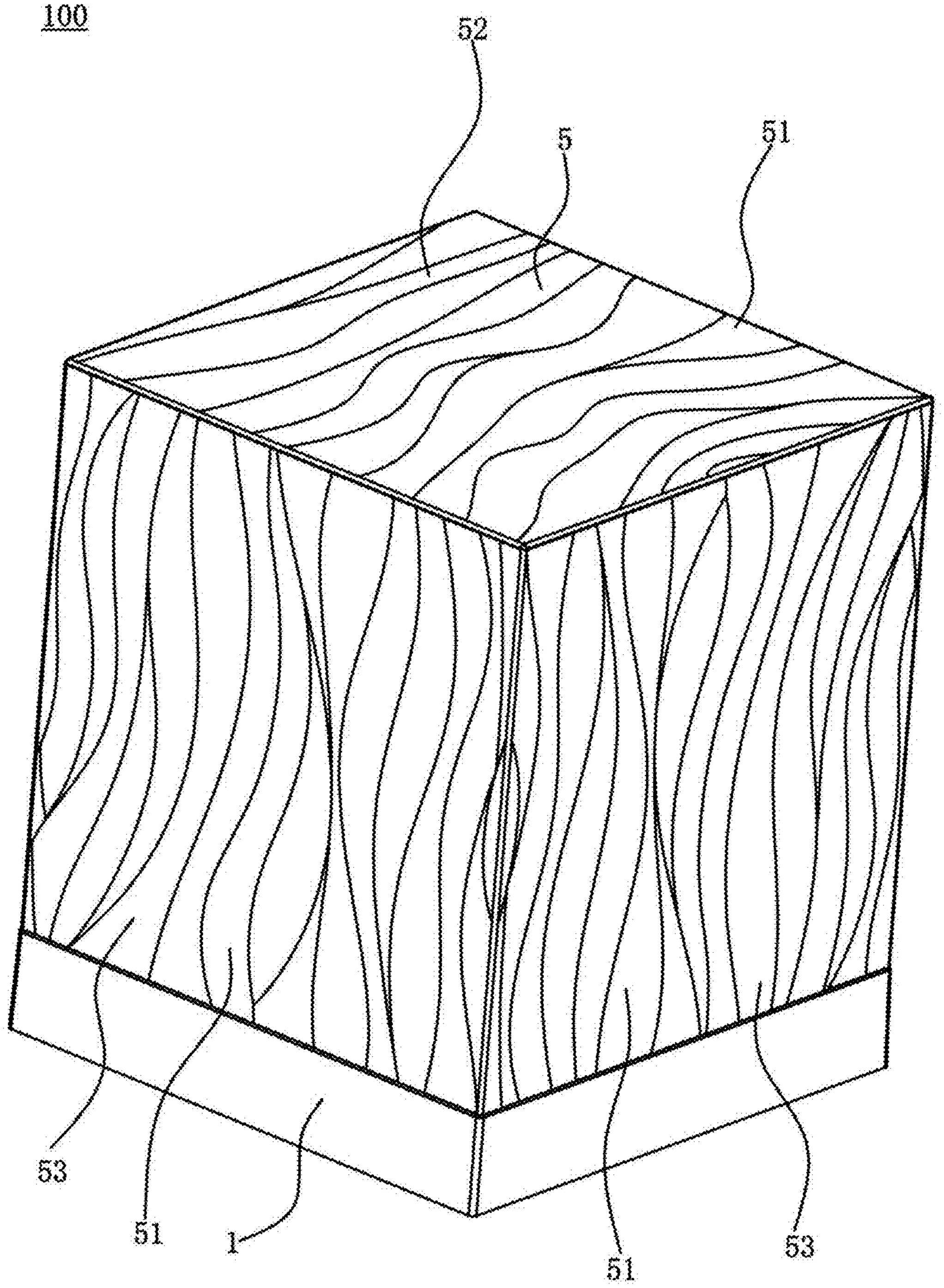
FIG. 2 is a three-dimensional view of FIG. 1 after rotating by a certain angle.
Figure 3:
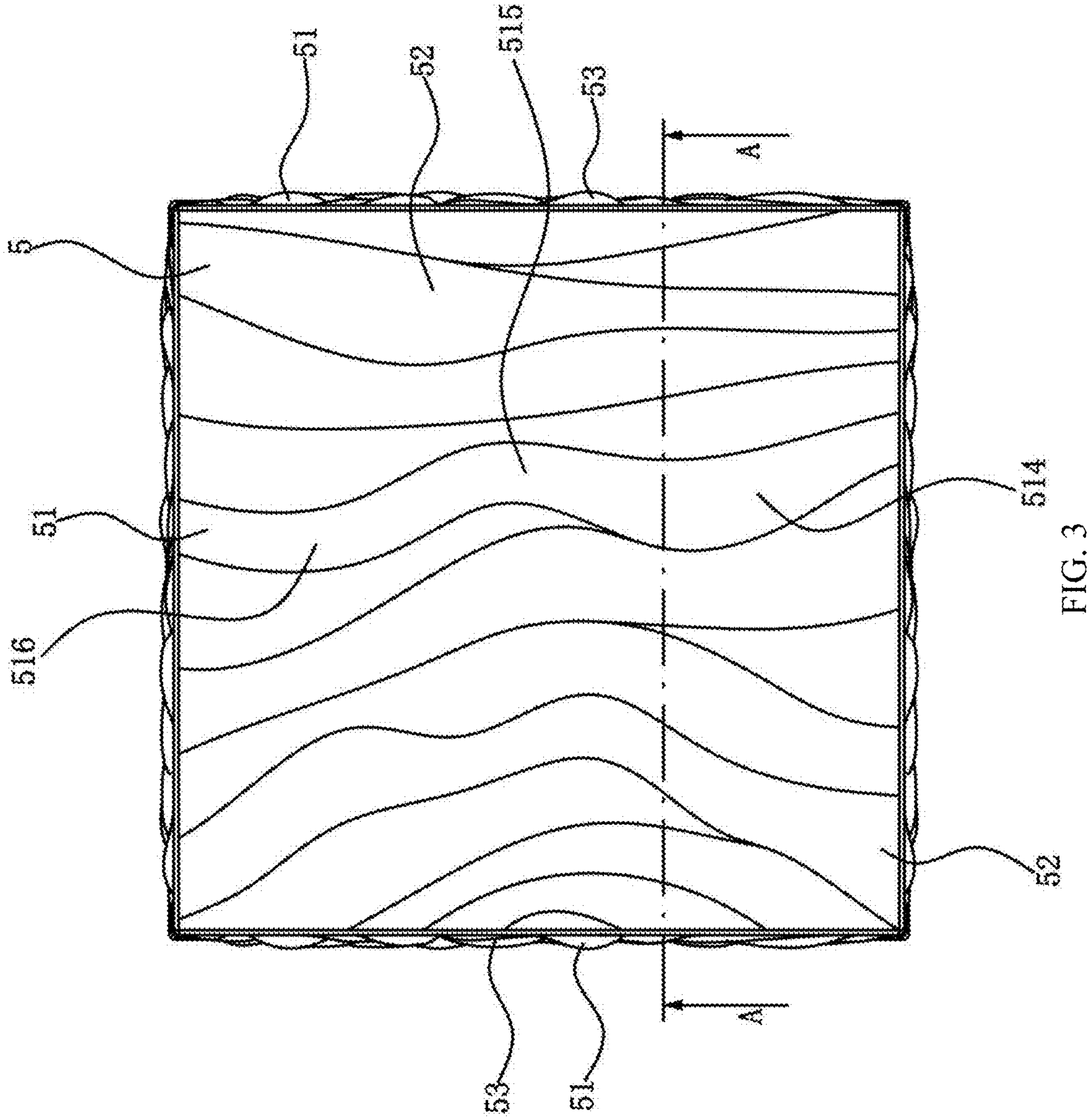
FIG. 3 is a top view of FIG. 1.

| projector 100 | fastening base 1 | bottom base 11 | step portion 111 |
|---|---|---|---|
| snap-fitting block 112 | guide slope 1121 | snap-fitting portion 1122 | cover body 12 |
| upper base 13 | accommodating | limiting | positioning |

-continued

| projector 100 | fastening base 1 | bottom base 11 | step portion 111 |
|---|---|---|---|
| | cavity 131 | groove 132 | groove 133 |
| lead hole 134 | fastening portion 135 | limiting portion 136 | electric motor assembly 2 |
| base body 21 | fastening lug 22 | rotating shaft portion 23 | light source assembly 3 |
| lamp panel 31 | fool-proof portion 311 | through hole 32 | first optical element 4 |
| convex lens 41 | second optical element 5 | elongated lens 51 | outer contour 511 |
| cross section 512 | slot 513 | first portion 514 | second portion 515 |
| third portion 516 | first optical plate 52 | second optical plate 53 | snap-fitting groove 531 |
| lock block 532 | | | |

DETAILED DESCRIPTION OF THE EMBODIMENTS

At present, the present invention is further described in conjunction with accompanying drawings and specific embodiments, so as to better understand the purposes, structures, features and functions of the present invention.

As shown in FIG. 1-FIG. 10, a projector 100 in the present invention includes a fastening base 1, an electric motor assembly 2, a light source assembly 3 and a control panel which are mounted on the fastening base 1, and a first optical element 4 and a second optical element 5 located above the electric motor assembly 2, where the electric motor assembly 2 drives the first optical element 4 to rotate.

Figure 4:
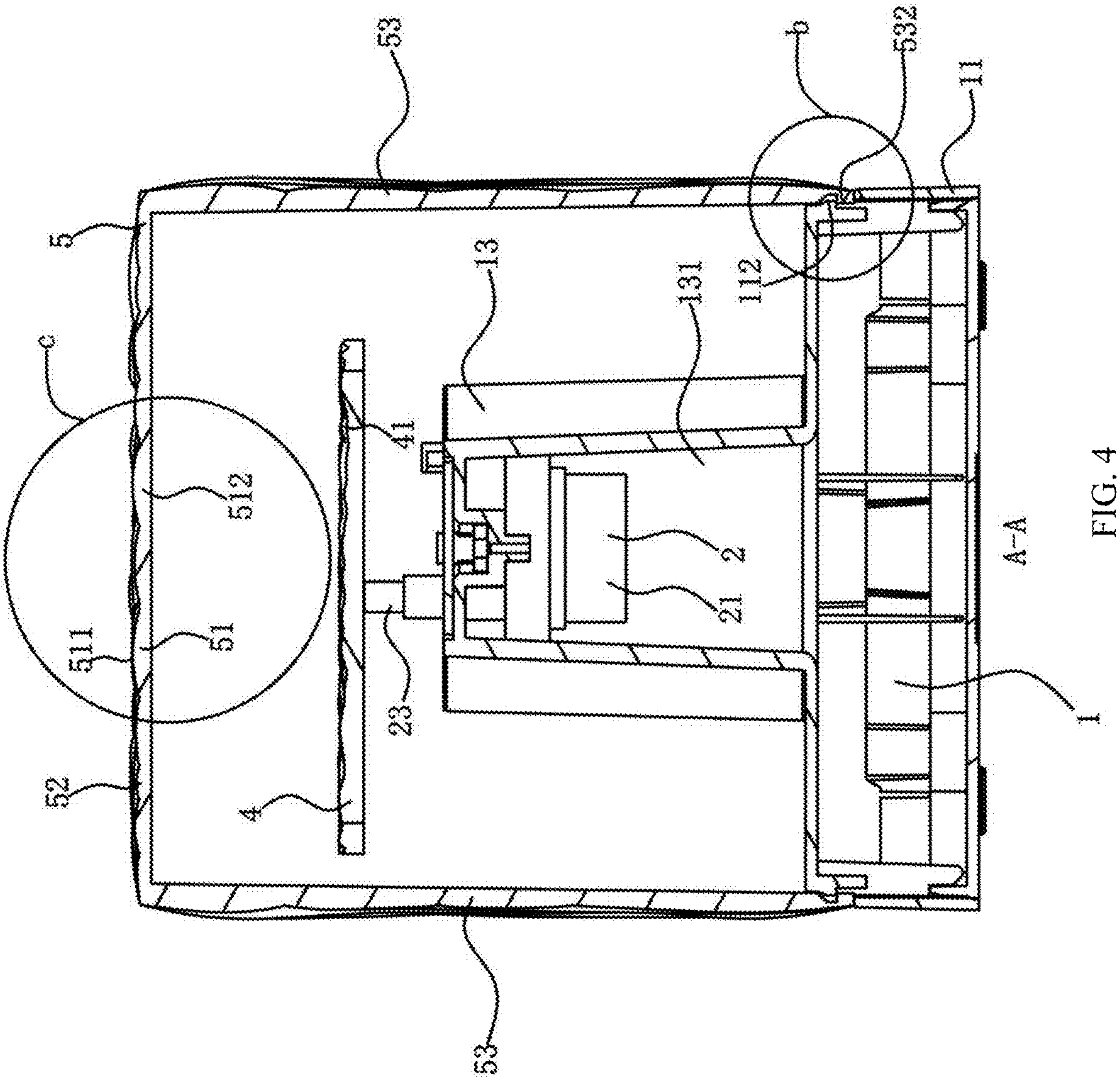
FIG. 4 is a sectional view taken along an A-A line in FIG. 3.
Figure 5:
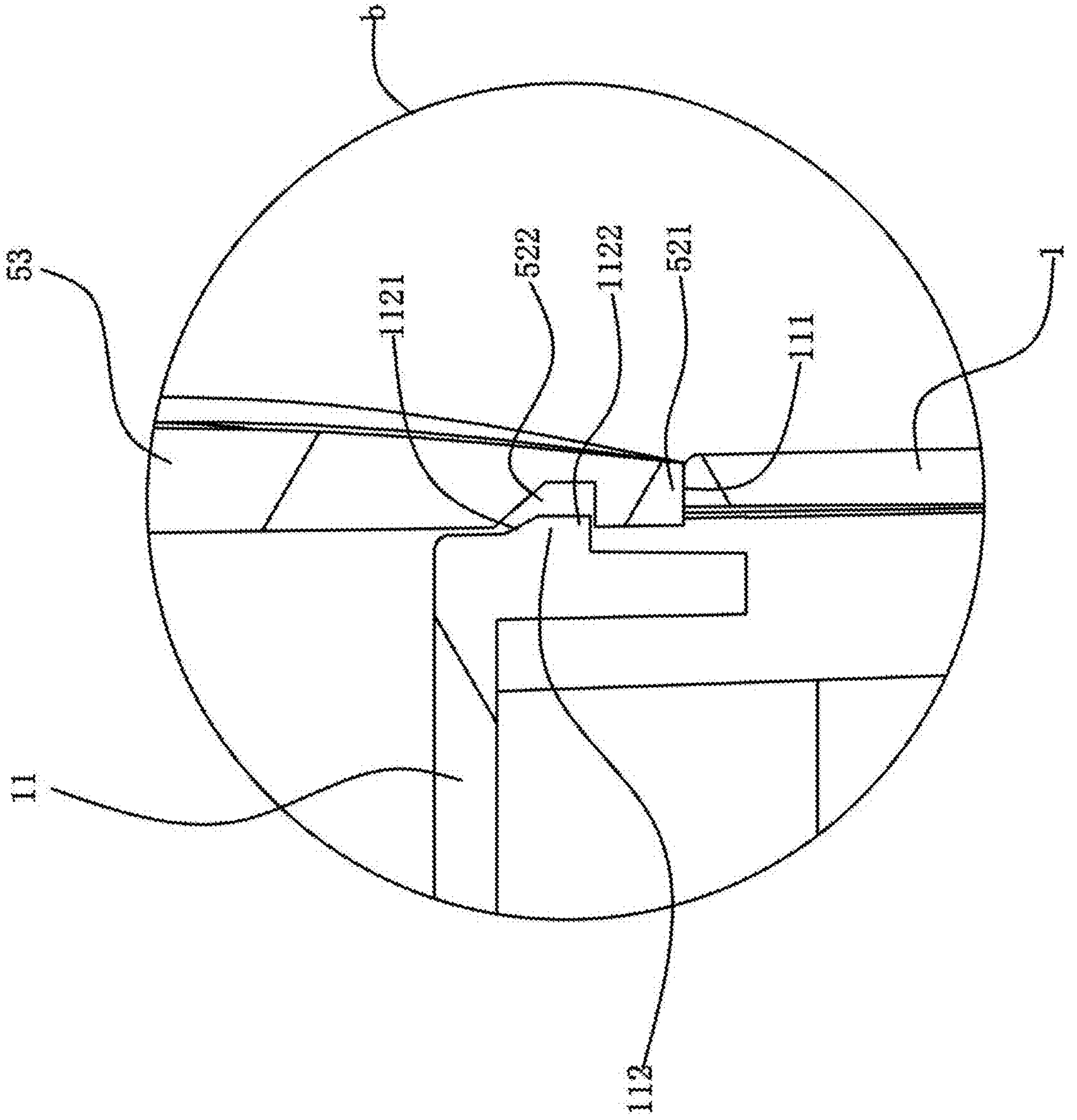
FIG. 5 is a partial enlarged view at b in FIG. 4.
Figure 6:
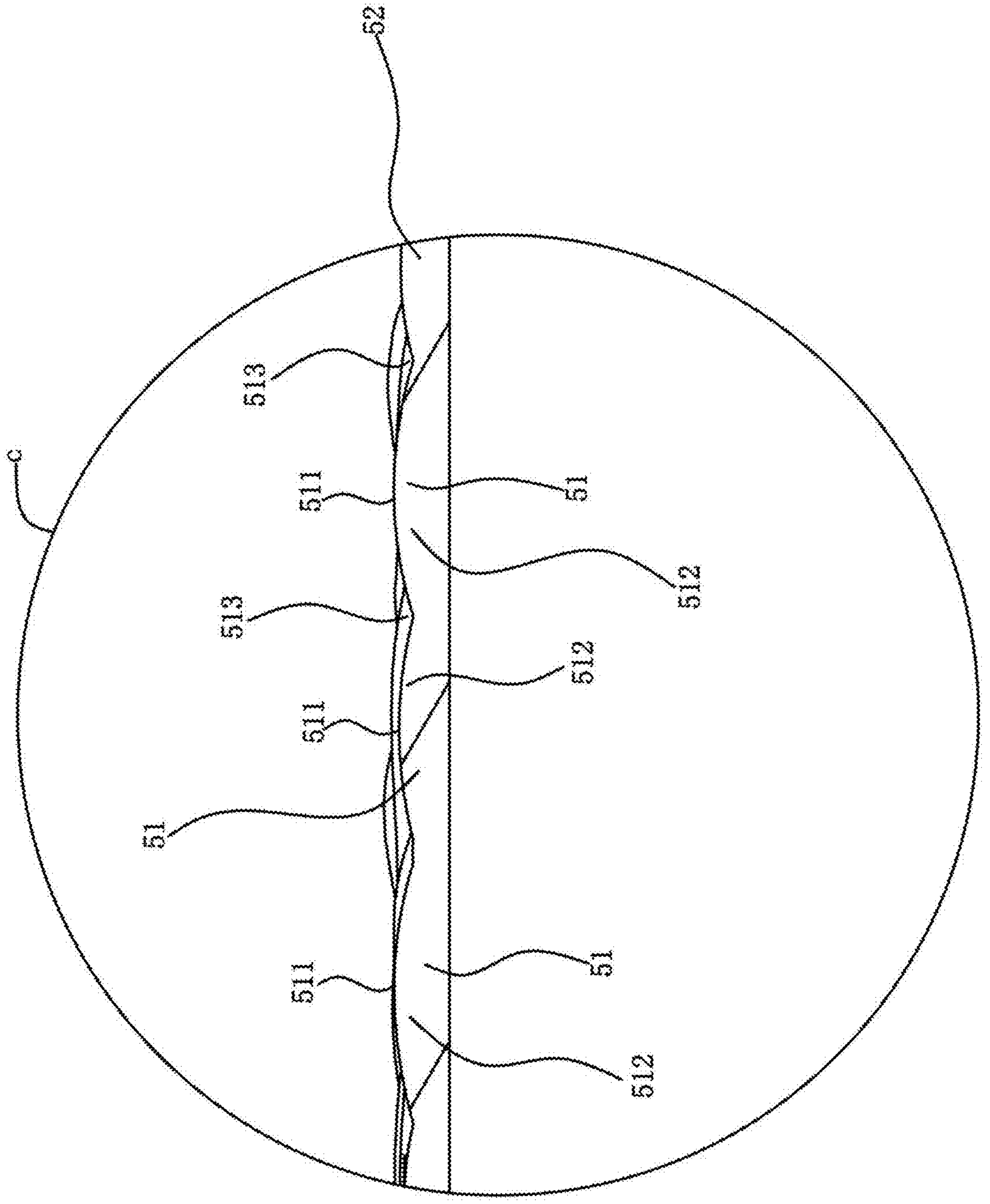
FIG. 6 is a partial enlarged view at c in FIG. 4.
Figure 7:
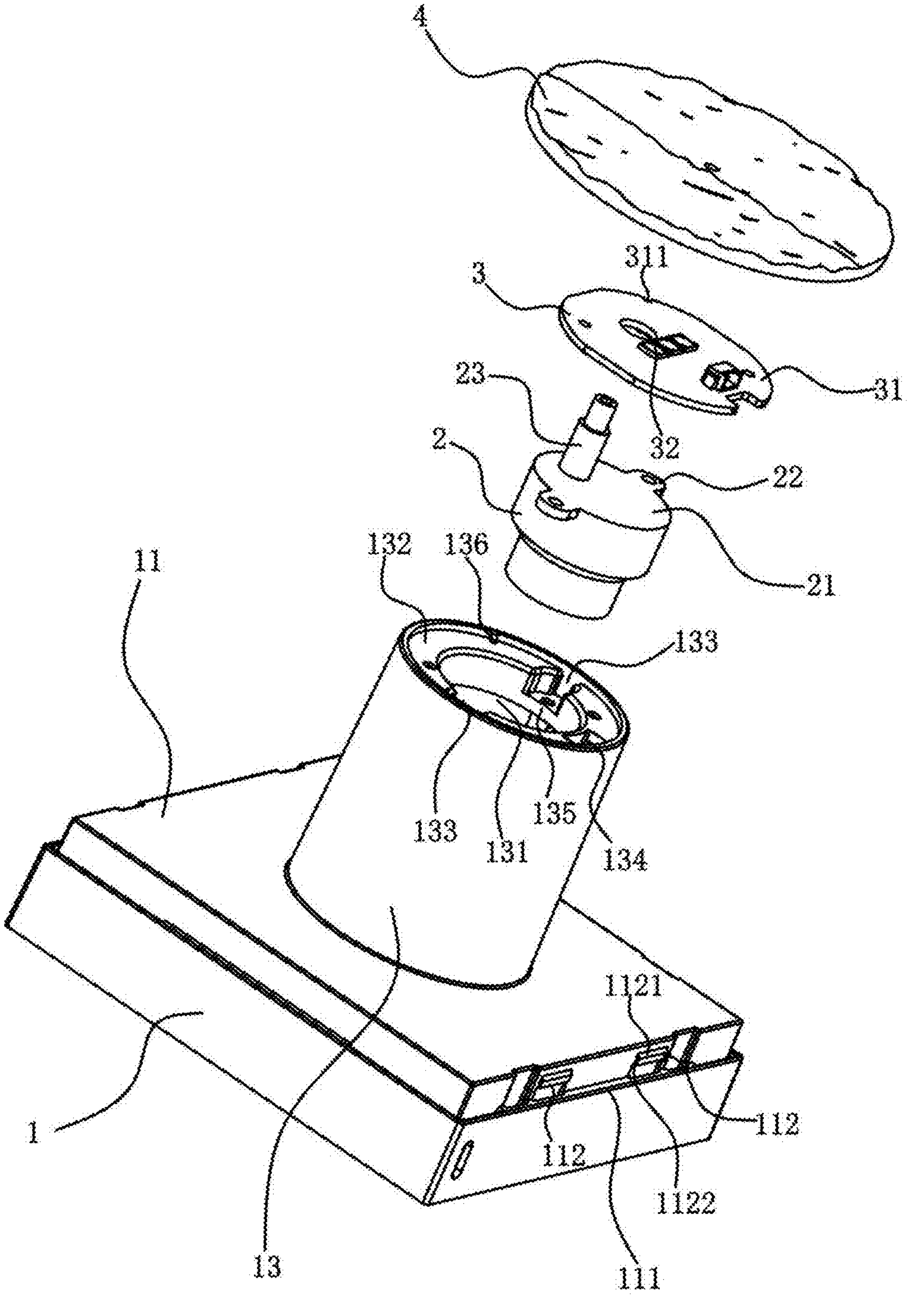
FIG. 7 is a three-dimensional exploded view of FIG. 1 after a second optical element is removed.
Figure 8:
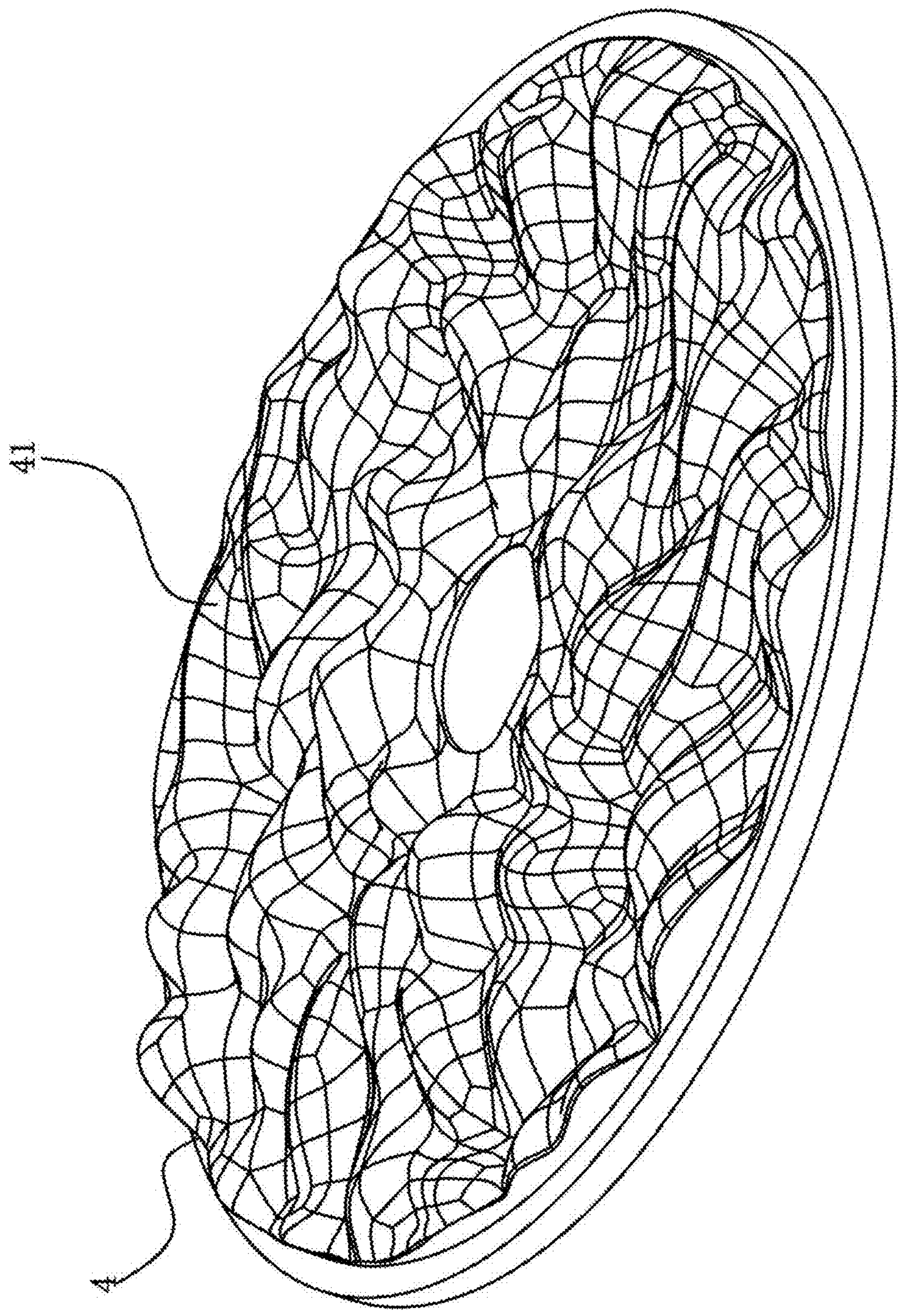
FIG. 8 is a schematic diagram of a first optical element in FIG. 7.
Figure 9:
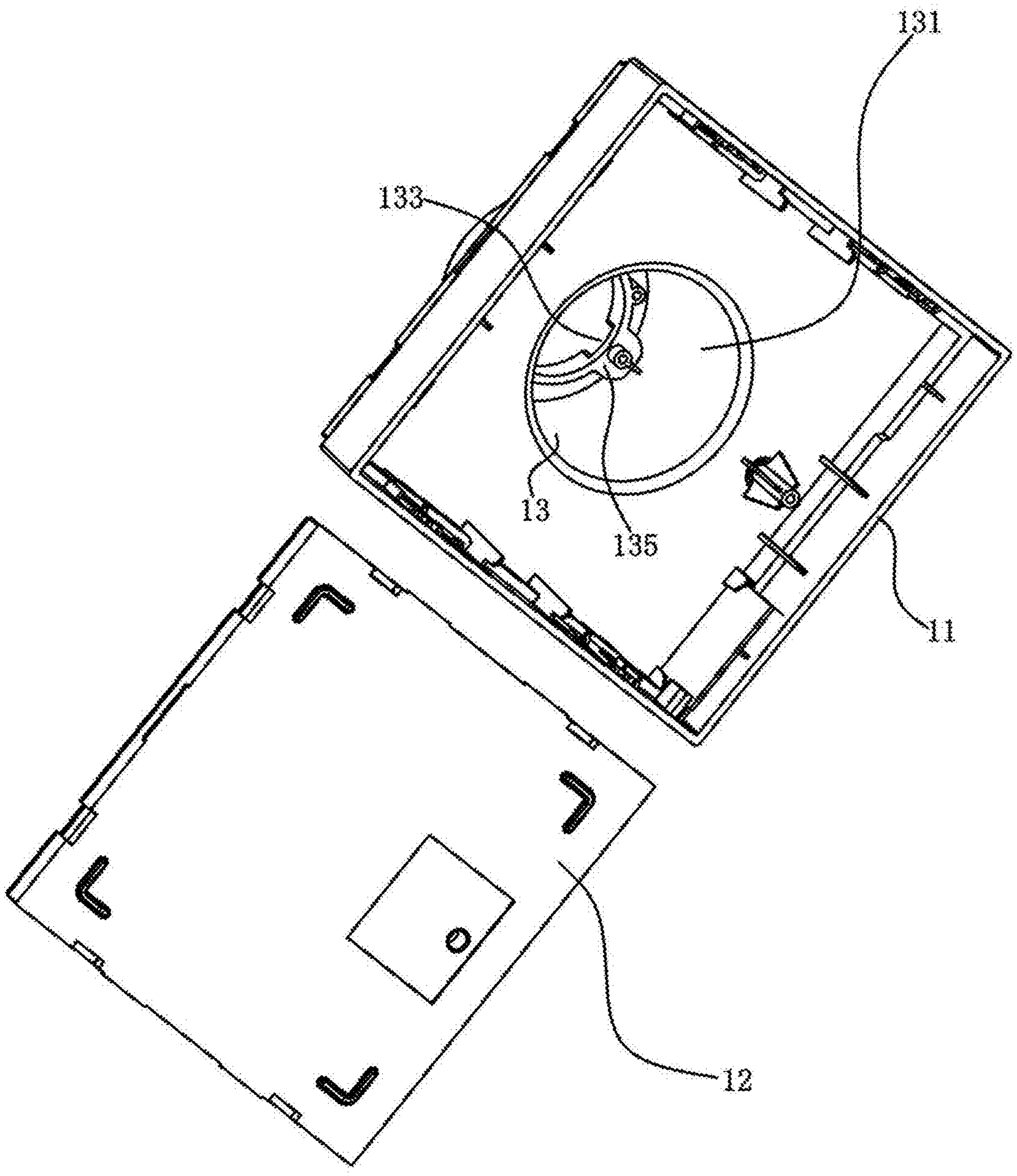
FIG. 9 is a three-dimensional exploded view of a bottom base in FIG. 7.
Figure 10:
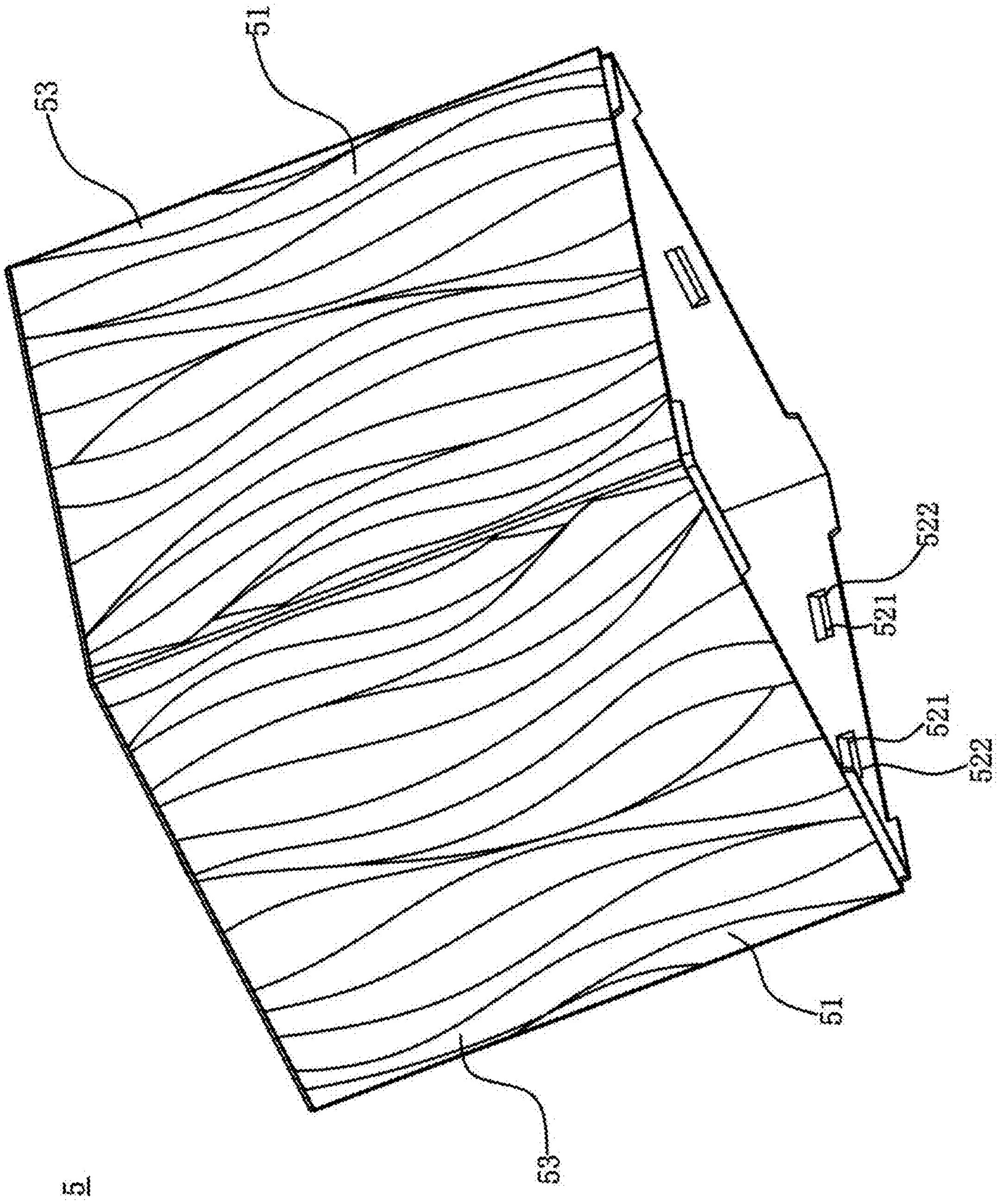
FIG. 10 is a three-dimensional view of a second optical element in FIG. 1.

As shown in FIG. 1, FIG. 4 and FIG. 7, the fastening base 1 includes a bottom base 11, a cover body 12 mounted on the bottom base 11, and an upper base 13 formed by extending upwards from the bottom base 11. The bottom base 11 includes a step portion 111 recessed downwards from a top surface thereof and snap-fitting blocks 112 located above the step portion 111. The step portion 111 surrounds a periphery of the bottom base 11. In this embodiment, the bottom base 11 is arranged to be of a cuboid structure, the step portion 111 is formed on four side surfaces of the bottom base 11, the snap-fitting blocks 112 are at least arranged on two side surfaces of the bottom base 11, the snap-fitting blocks 112 are located on a side surface of the step portion 111 closer to the center of the bottom base 11, and the side surface is connected to the step portion 111. Each snap-fitting block 112 includes a guide slope 1121 and a snap-fitting portion 1122 formed by extending downwards from the guide slope 1121. The cover body 12 upwards covers the bottom base 11. The upper base 13 is located in the middle of the bottom base 11, and the width of the upper base 13 is less than the width of the bottom base 11. The upper base 13 includes an accommodating cavity 131 penetrating vertically, a limiting groove 132 in communication with the accommodating cavity 131, a plurality of positioning groove 133 and a lead hole 134. The accommodating cavity 131 penetrates through the bottom base 11 downwards, the control panel is mounted on the cover body 12 and protrudes upwards into the accommodating cavity 131. The limiting groove 132 is formed by being recessed downwards from a top surface of the upper base 13, and the limiting groove 132 is greater than an opening of the accommodating cavity 131, that is, a peripheral portion of the limiting groove 132 is arranged around the opening of the accommodating cavity 131. The positioning grooves 133 are formed by being recessed downwards from a bottom wall of the limiting groove 132. The two positioning grooves 133 are located on left and right sides of the accommodating cavity 131. The lead hole 134 penetrates through the bottom wall of the limiting groove 132 upwards. An electric lead electrically connected to the control panel passes through the lead hole 134 to be electrically connected to a lamp panel 31. The upper base 13 further includes a plurality of fastening portions 135, and the fastening portions 135 are formed on bottom walls of the positioning grooves 133. The upper base 13 further includes a limiting portion 136 formed by extending from a side wall of the limiting groove 132, and the limiting portion 136 protrudes into the limiting groove 132.

As shown in FIG. 4 and FIG. 7, the electric motor assembly 2 is mounted on the upper base 13, and the electric motor assembly 2 includes a base body 21, a plurality of fastening lugs 22 formed by extending from the base body 21, and a rotating shaft portion 23. The base body 21 is accommodated in the accommodating cavity 131, the two fastening lugs 22 are correspondingly accommodated in the positioning grooves 133 on a one-to-one basis, and each fastening lug 22 is fastened to one of the fastening portions 135. The light source assembly 3 includes the lamp panel 31 and a through hole 32 penetrating through the lamp panel 31. The lamp panel 31 includes a fool-proof portion 311 located on an outer side of the through hole 32. The lamp panel 31 is mounted on the limiting groove 132 and is fastened to the upper base 13. The rotating shaft portion 23 penetrates through the through hole 32 upwards and goes upwards beyond the upper base 13. The fool-proof portion 311 is fitted with the limiting portion 136, so as to avoid reverse mounting of the lamp panel 31. In this embodiment, the limiting portion 136 is of a protruding portion structure, the fool-proof portion 311 is arranged to be of a groove structure, and the limiting portion 136 protrudes into the accommodating groove; or the fool-proof portion 311 is of a protruding portion structure, and the limiting portion 136 is of a groove structure.

As shown in FIG. 4 and FIG. 7, the first optical element 4 is fastened to the rotating shaft portion 23. The first optical element 4 includes a plurality of convex lenses 41, one of the convex lenses 41 has a different focal length, radian or orientation from the other convex lens 41, and an included angle between two adjacent convex lenses 41 is inconsistent. Light emitted by the lamp panel 31 passes through the plurality of convex lenses 41, and the first optical element 4 forms a plurality of irregular light emitting sources. The values of distances between the first optical element 4 and the bottom base 11 are in a range of 30-300 mm. The first optical element 4 can be arranged to be of a flat plate structure or a hollow cylindrical structure. The first optical element 4 arranged to be of the hollow cylindrical structure includes a first light transmitting plate extending in a horizontal direction and a second light transmitting plate arranged around the first light transmitting plate, and each of the first light transmitting plate and the second light transmitting plate is provided with the plurality of convex lenses 41. Or the first optical element 4 is arranged to be of a roller structure. Light emitted by the light source assembly 3 passes through the first light transmitting plate and the second light transmitting plate, such that the projection light effect can be formed on a top ceiling and a surrounding ceiling. the first optical element 4 is selected from at least one of the following types of optical elements: slide, condensing lens and corrugated piece, which meet the projection relationship. In this embodiment, the first optical element 4 comprises multiple convex lenses 41 formed by upward protrusion, wherein the height of the convex lens is smaller than that of the second optical element, at least some convex lenses include a refractive surface and/or a reflective surface, and the multiple convex lenses at least include a first convex lens, a second convex lens, and/or a third convex lens, the height of the first convex lens in the up and down directions is lower than the height of the second convex lens in the up and down directions, and/or the height of the second convex lens in the up and down directions is lower than the height of the third convex lens in the up and down directions.

As shown in FIG. 1, FIG. 5, FIG. 6 and FIG. 10, the second optical element 5 is located above the first optical element 4 and covers the light source assembly 3. The first optical element 4 is located in a range of 1F-2F of the second optical element 5, and the F is defined as the focal length of the second optical element 5. The second optical element 5 is selected from at least one of the following types of optical elements multi-section lenses, imaging lens and multiple irregular line lenses, which meet the projection relationship. In this embodiment, the second optical element 5 includes a plurality of irregular elongated lenses 51, and outer contours 511 of cross sections 512 of one of the elongated lenses 51 and the other elongated lens 51 at the same position are at least partially identical, or parabolic contours of two adjacent elongated lenses 51 at the same position are at least partially identical. A slot 513 is formed between two adjacent irregular elongated lenses 51, and a value of an included angle formed by extension lines of the slot 513 is in a range of 98-178 degrees. The first optical element 4 is located in a range of 1F-2F of the elongated lenses 51, F is the focal length of the elongated lenses 51, and the F values of the elongated lenses 51 are in a range of 10-60 mm. The width of each of the elongated lenses 51 in a length direction is gradually increased and then gradually reduced, or is gradually reduced and then gradually increased. Each of the elongated lenses 51 has a width range of 2-20 mm, and as the radian of the elongated lens 51 increases, the corresponding focal length is longer. Some of the elongated lenses 51 each include a first portion 514 deformed leftwards and a second portion 515 deformed rightwards, or the first portion 514 deformed leftwards, the second portion 515 deformed rightwards and a third portion 516 deformed leftwards. The plurality of elongated lenses 51 are arranged in a left-and-right direction, and the length of each of the elongated lenses 51 is greater than three times the width thereof. The distances between the highest points of the plurality of elongated lenses 51 in the middle of the second optical element 5 and the same horizontal plane of the first optical element 4 are equal. The second optical element 5 includes a first optical plate 52 and at least one second optical plates 53 around the first optical plate 52. In this embodiment, the first optical plate 52 is located above the first optical element 4, the plurality of second optical plates 53 surround the first optical plate 52, and the first optical plate 52 and the plurality of second optical plates 53 enclose a hollow cuboid structure. The plurality of second optical plates 53 are located above the step portion 111, and are firmly connected to the fastening base 1. Each of the first optical plate 52 and/or the second optical plates 53 is provided with the plurality of irregular elongated lenses 51, the plurality of elongated lenses 51 are formed on an outer surface or an inner surface of each of the first optical plate 52 and/or the plurality of second optical plates 53, and the first optical plate 52 and the plurality of second optical plates 53 are integrally formed or separately formed. When the first optical plate 52 and the plurality of second optical plates 53 are separately formed, the first optical plate 52 and the plurality of second optical plates 53 are fastened to each other by means of an adhesive. At least two of the second optical plates 53 are provided with snap-fitting grooves 531 and lock blocks 532 located below the snap-fitting grooves 531, the lock blocks 532 move downwards along the guide slopes 1121, the snap-fitting portions 1122 are accommodated in the snap-fitting grooves 531, the lock blocks 532 are snap-fitted with the snap-fitting portions 1122, the snap-fitting portions 1122 prevent the lock blocks 532 from moving upwards, and the step portion 111 limits the lock blocks 532 from moving downwards. Or the second optical element 5 is fastened to the fastening base 1 by means of screws, and the screws are located at a joint of two of the second optical plates 53. The second optical element 5 can be formed by two or more lines, for example, the first optical plate 52 can be formed by combining the plurality of irregular elongated lenses 51 and the lines in other types; and for example, the first optical plate 52 can be designed to have the irregular elongated lenses 51 in the middle and the lines similar to the first optical element 4 on the periphery. The plurality of second optical plates 53 can be arranged in the types of irregular short lenses, or some of the second optical plates 53 can be arranged as the lines of the first optical element 4. In other solutions, the second optical plates 53 can also be formed by two or more lines.

In conclusion, the projector in the present invention has the following beneficial effects:

(1) the electric motor assembly 2 is fastened to the fastening base 1, the light source assembly 3 is firmly connected to the fastening base 1, the first optical element 4 is located above the electric motor assembly 2, the electric motor assembly 2 drives the first optical element 4, the first optical element 4 is selected from at least one of the following types of optical elements: slides, condensing lenses or corrugated pieces; and light emitted 3 by the light source assembly passes through the first optical element; and a second optical element 5, located above the first optical element 4, wherein the first optical element 4 is located in a range of 1F-2F of the second optical element 5; and the second optical element 5 is selected from at least one of the following types of optical elements: multi-section lenses, imaging lenses or irregular elongated lenses. The first optical element 4 is located in a range of 1F-2F of the second optical element 5, thus it is ensured that the first optical element 4 is located in a clear projection range of the second optical element 5, the amplified projection effect can be achieved, and the use requirements can be met.

The above detailed description is only the description of preferred embodiments of the present invention, and is not intended to limit the scope of patent of the present invention. Therefore, any equivalent technical change made by means of the content of the specification and drawings of the present invention should be included in the scope of patent of the present invention.

What is claimed is:

1. A projector, comprising:

a fastening base;

an electric motor assembly, fastened to the fastening base;

a light source assembly, firmly connected to the fastening base;

a first optical element, located above the electric motor assembly, wherein the electric motor assembly drives the first optical element; the first optical element comprises a plurality of convex lenses and light emitted by the light source assembly passes through the first optical element; and a second optical element, located above the first optical element, wherein the second optical element comprises a plurality of irregular elongated lenses, and the first optical element is located in a range of 1F-2F of the second optical element.

2. The projector according to claim 1, wherein parabolic contours of two adjacent elongated lenses at the same position are at least partially identical.

3. The projector according to claim 2, wherein each of the elongated lenses has a width range of 2-20 mm, and as the radian of the elongated lens increases, a corresponding focal length is longer.

4. The projector according to claim 3, wherein each of the elongated lenses comprises a first portion deformed leftwards and a second portion deformed rightwards, or the first portion deformed leftwards, the second portion deformed rightwards and a third portion deformed leftwards.

5. The projector according to claim 1, wherein the first optical element is located in a range of 1F-2F of the elongated lenses.

6. The projector according to claim 1, wherein the distances between the highest points of the plurality of elongated lenses in the middle of the second optical element and the same horizontal plane of the first optical element are equal.

7. The projector according to claim 1, wherein the second optical element comprises a first optical plate and second optical plates arranged around the first optical plate, the first optical plate is located above the first optical element, and the second optical plates are arranged around the light source assembly; and the fastening base comprises a step portion recessed downwards from a top surface thereof, and the step portion prevents the second optical element from moving downwards.

8. The projector according to claim 1, wherein the plurality of convex lenses are formed by upward protrusions, wherein the height of the plurality of convex lenses is smaller than that of the second optical element, at least some of the plurality of convex lenses include at least one of a refractive surface and/or a reflective surface, and the plurality of convex lenses include at least one of a first convex lens, a second convex lens, and a third convex lens.

9. The projector according to claim 8, wherein the second optical element comprises a first optical plate and second optical plates around the first optical plate, wherein the plurality of elongated lenses of the first optical plate are formed by extending in a front-and-back direction, the plurality of elongated lenses of a plurality of the second optical plates are formed by extending in an up-and-down direction, the plurality of elongated lenses are arranged on an outer surface or an inner surface of the first optical plate, inner surfaces or outer surfaces of at least some of the second optical plates are provided with the elongated lenses, and the first optical plate and the plurality of second optical plates are integrally formed or separately formed.

10. A projector, comprising:

a fastening base;

an electric motor assembly, fastened to the fastening base;

a light source assembly, firmly connected to the fastening base;

a first optical element, located above the electric motor assembly, wherein the electric motor assembly drives the first optical element; and the first optical element comprises a plurality of convex lenses, and one of the convex lenses has a different focal length, radian or orientation from the other convex lens; and a second optical element, located above the first optical element, wherein the second optical element comprises a plurality of irregular elongated lenses, outer contours of cross sections of one of the elongated lenses and the other elongated lens at the same position are at least partially identical, and the first optical element is located in a range of 1F-2F of the elongated lenses.

11. The projector according to claim 10, wherein the second optical element comprises a first optical plate and second optical plates arranged around the first optical plate, the first optical plate is located above the first optical element, the second optical plates are arranged around the light source assembly, and the second optical plates are fastened to the fastening base.

12. The projector according to claim 11, wherein the F values of the plurality of elongated lenses are in a range of 10-60 mm, and the width of each of the elongated lenses in a length direction is gradually increased and then gradually reduced, or is gradually reduced and then gradually increased.

13. The projector according to claim 10, wherein the fastening base comprises a bottom base and an upper base formed by extending upwards from the bottom base, the upper base comprises an accommodating cavity penetrating upwards and a limiting groove arranged in communication with the accommodating cavity, the limiting groove is formed by being recessed downwards from a top surface of the upper base, the electric motor assembly is accommodated in the accommodating cavity and is fastened to the upper base, the light source assembly is mounted in the limiting groove and is located above the electric motor assembly, and the second optical element is arranged around the light source assembly and is firmly connected to the bottom base.

14. The projector according to claim 13, wherein the second optical element comprises a first optical plate and a plurality of second optical plates around the first optical plate, each of the first optical plate and the second optical plates is provided with the plurality of elongated lenses, the first optical plate is located above the first optical element, the plurality of elongated lenses are arranged on an outer surface or an inner surface of the first optical plate, inner surfaces or outer surfaces of at least some of the second optical plates are provided with the elongated lenses, and the first optical plate and the plurality of second optical plates are integrally formed or separately formed.

15. A projector, comprising:

a fastening base;

an electric motor assembly, fastened to the fastening base;

a light source assembly, firmly connected to the fastening base;

a first optical element, located above the electric motor assembly, wherein the electric motor assembly drives the first optical element; and the first optical element comprises a plurality of convex lenses, and one of the convex lenses has a different focal length, length or orientation from the other convex lens; and a second optical element, located above the first optical element, wherein the second optical element comprises a plurality of irregular elongated lenses, the first optical element is located in a range of 1F-2F of the elongated lenses, a slot is formed between two adjacent elongated lenses, and a value of an included angle formed by extension lines of the slot is in a range of 98-178 degrees.

16. The projector according to claim 15, wherein each of the elongated lenses has a width range of 2-20 mm, and outer contours of cross sections of two adjacent elongated lenses at the same position are at least partially identical.

17. The projector according to claim 15, wherein the second optical element comprises a first optical plate and a plurality of second optical plates around the first optical plate, the plurality of second optical plates are firmly connected to the fastening base, each of the first optical plate and/or the second optical plates is provided with the plurality of irregular elongated lenses, the plurality of elongated lenses are arranged on an outer surface or an inner surface of the first optical plate, inner surfaces or outer surfaces of at least some of the second optical plates are provided with the elongated lenses, and the first optical plate and the plurality of second optical plates are integrally formed or separately formed.

18. The projector according to claim 15, wherein the second optical element comprises a first optical plate and second optical plates arranged around the first optical plate, the first optical plate is located above the first optical element, and the second optical plates are arranged around the light source assembly.

19. The projector according to claim 18, wherein the plurality of second optical plates are arranged around the first optical plate, the first optical plate comprises the plurality of elongated lenses, the fastening base comprises snap-fitting blocks, each of the snap-fitting blocks comprises a guide slope, at least two of the second optical plates are provided with lock blocks, and the lock blocks move downwards along the guide slopes to be snap-fitted with the snap-fitting blocks; or the second optical element is fastened to the fastening base by means of screws, and the screws are located at a joint of two of the second optical plates.

20. The projector according to claim 15, wherein the plurality of elongated lenses are arranged in a left-and-right direction, the length of each of the elongated lenses is greater than three times the width thereof, and the F values of the elongated lenses are in a range of 10-60 mm.

* * * * *